United States Patent [19]

Matsuo et al.

[11] 3,962,145

[45] June 8, 1976

[54] HIGH TEMPERATURE THERMISTOR COMPOSITION

[75] Inventors: Yoshihiro Matsuo, Neyagawa; Shigeru Hayakawa, Hirakata, both of Japan

[73] Assignee: Matsushita Electric Industrial Co., Ltd., Osaka, Japan

[22] Filed: June 18, 1974

[21] Appl. No.: 480,547

[30] Foreign Application Priority Data
June 20, 1973 Japan............................... 48-70318
June 20, 1973 Japan............................... 48-70317
Dec. 17, 1973 Japan............................. 48-142288
Dec. 17, 1973 Japan............................. 48-142289

[52] U.S. Cl................................ 252/519; 252/518; 252/521
[51] Int. Cl.²........................................ H01B 1/08
[58] Field of Search............. 252/519, 521; 106/66, 106/59

[56] References Cited
UNITED STATES PATENTS
3,510,820  5/1970  Jonker et al.................. 252/519 X
3,615,775  10/1971  Teeter............................... 106/59

*Primary Examiner*—Benjamin R. Padgett
*Assistant Examiner*—E. Suzanne Parr
*Attorney, Agent, or Firm*—Wenderoth, Lind & Ponack

[57] ABSTRACT

A high temperature thermistor composition comprising essentially a spinel-type solid solution being formed from a unity in the sum of a molar fraction of at least one oxide selected from the group consisting of magnesium oxide, nickel oxide, cobalt oxide, manganese oxide and zinc oxide and a unity in the sum of a molar fraction of aluminum oxide, chromium oxide, and at least one oxide selected from the group consisting of iron oxide, manganese oxide, cobalt oxide and antimony oxide.

19 Claims, 2 Drawing Figures

HIGH TEMPERATURE THERMISTOR COMPOSITION

BACKGROUND OF THE INVENTION

This invention relates to a composition for thermistor, and more particularly to a composition for high temperature thermistors.

The conventional thermistors have been used for temperature measurement usually in the range of from room temperature to about 300°C. Such kind of thermistor is of a composition comprising cobalt oxide, manganese oxide, nickel oxide and/or iron oxide.

Recently, a high temperature thermistor which can be operable at a high temperature range up to about 1000°C has been developed. For example, it was disclosed in Japanese Pat. Publication S41-15855/1966 that the thermistors, which consists of the solid solution of $SnO_2$-$TiO_2$ system as the principal component and additive of at least one oxide selected from the group consisting of $Sb_2O_3$ and $Ta_2O_3$ in the amount of less than 5% by mole, were able to be used in a high temperature up to 1000°C. It was also disclosed in Rev. of Scientific Inst., 40 pp. 544–549 (1969) that the thermistors consisting of $ZrO_2$ as the principal component and additive of $Y_2O_3$ were able to be operable in a high temperature to about 1000°C. Furthermore, it was disclosed in U.S. Pat. No. 3,598,764 (1971) that the thermistors consisting of $CeO_2$ as the principal component and additive of $ZrO_2$ in the amount of 2 to 15% by weight were able to be used in a high temperature up to 1000°C.

However, these conventional materials for a high temperature thermistor have inferior and time-dependent characteristics. Particularly, they display unstability in usage on a high temperature under an application of a d.c. voltage.

Recently, a high temperature thermistor which can be used in a working temperature above 300°C has been intensively required. For example, it is desired to be used for a temperature controller, which has the working temperature range of 600°C to 1000°C, of a thermal reactor of a motor car in which an exhausting gas from an engine is reburnt. In such a case, the high temperature thermistors must be used under an application of d.c. voltage, because an electric power source in a motorcar is a d.c. electrical battery.

SUMMARY OF THE INVENTION

It is, therefore, an object of the present invention to provide novel compositions of high temperature thermistors having superior and steady electrical characteristics.

It is another object of the present invention to provide compositions of high temperature thermistors having a high stability of electrical characteristics in load aging under an application of a d.c. voltage.

It is further the object of the present invention to provide a high temperature thermistor composition comprising a spinel-type solid solution and having resistance and B-value which can be widely changed in a working temperature with variation of the amounts of the components of said solid solution.

These objects are achieved by providing a high temperature thermistor composition according to the present invention, which comprises a spinel-type solid solution being formed from a unity in the sum of a molar fraction of at least one oxide selected from the group consisting of magnesium oxide, nickel oxide, cobalt oxide, manganese oxide and zinc oxide and a unity in the sum of a molar fraction of aluminum oxide, chromium oxide, and at least one oxide selected from the group consisting of iron oxide, manganese oxide, cobalt oxide and antimony oxide, wherein said aluminum oxide is in the amount of 0.005 to 0.8 by a molar fraction, said chromium oxide is in the amount of 0.03 to 0.95 by a molar fraction, and said at least one oxide selcted from the group consisting of iron oxide, manganese oxide, cobalt oxide and antimony oxide is in the amount of 0.005 to 0.7 by a molar fraction.

BRIEF DESCRIPTION OF THE DRAWINGS

These and other objects and features and advantages of the present invention will be apparent upon consideration of the following detailed description taken together with the accompanying drawings in which.

DETAILED DESCRIPTION OF THE INVENTION

Figure 1:
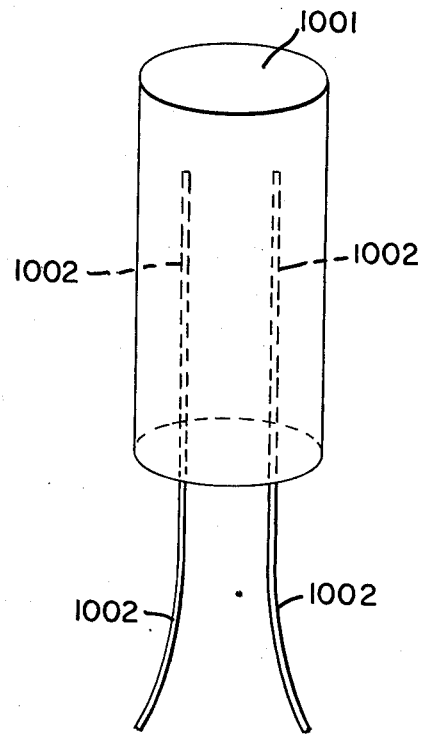
FIG. 1 is a schematic view of a high temperature thermistor of the rod type according to the present invention.

It has been discovered according to the present invention that a high temperature thermistor showing a high stability of electrical characteristics in load aging under an application of a d.c. voltage is achieved by using a sintered body of a composition consisting essentially of a spinel-type solid solution which is formed from a unity in the sum of a molar fraction of at least one oxide selected from the group consisting of magnesium oxide, nickel oxide, cobalt oxide, manganese oxide and zinc oxide and a unity in the sum of a molar fraction of aluminum oxide, chromium oxide, and at least one oxide selected from the group consisting of iron oxide, manganese oxide, cobalt oxide and antimony oxide.

The preferred composition of a high temperature thermistor according to the present invention is formed from the ternary system of 0.5 to 80 mole percent of $MgAl_2O_4$, 3 to 95 mole percent of $MgCr_2O_4$, and 0.5 to 70 mole percent of $MgFe_2O_4$, wherein Mg can be substituted partially or fully by Ni, Co, Mn and Zn, and also Fe can be substituted partially or fully by Mn, Co and Sb. Although a spinel-type solid solution being formed from the binary system, for example, $MgAl_2O_4$13 $MgCr_2O_4$, $MgCr_2O_4$—$MgFe_2O_4$, or $MgAl_2O_4$—$NiFe_2O_4$ has inferior and unstable electrial acteristics, a spinel-type solid solution being formed from the ternary system, for example, $MgAl_2O_4$—$MgCr_2O_4$—$MgFe_2O_4$, $NiAl_2O_4$—$NiCr_2O_4$—$NiFe_2O_4$, or $CoAl_2O_4$—$CoCr_2O_4$—$CoMn_2O_4$ makes it possible to obtain a high temperature thermistor characterized by a high stability of electrical characteristics in load aging under an application of a d.c. voltage. Such a spinel-type solid solution as in the ternary system has an advantage that one can choose the desirable resistance and B-value in a working temperature by changing the amount of components of the spinel-type solid solution without changing the kind of said components.

Furthermore, the composition of said high temperatue thermistor can be incorporated with additives of less than 20 molar percent of at least one oxide selected from the group consisting of each component forming said composition of a spinel-type solid solution, that is, MgO, NiO, CoO, MnO, ZnO, $Al_2O_3$, $Cr_2O_3$, $Fe_2O_3$, $Mn_2O_3$, $Co_2O_3$, and $Sb_2O_3$. This incorporation with said additives also facilitates to choose the desirable resistance and B-value in a working temperature.

The compositions of the high temperature thermistor according to the present invention are formed from spinel-type solid solutions having the following chemical formula:

1. Generally, $(Mg_{[p_1]}Ni_{[p_2]}Co_{[p_3]}Mn_{[p_4]}Zn_{[p_5]})(Al_{[x]}Cr_{[y]}Fe_{[z_1]}Mn_{[z_2]}Co_{[z_3]}Sb_{[z_4]})_2O_4$ wherein $p_1+p_2+p_3+p_4+p_5=1$, $0 \leq p_n \leq 1$ ($n=1, 2, 3, 4, 5$), $z_1+z_2+z_3+z_4 = z$, $x+y+z=1$, $0.005 \leq x \leq 0.80$, $0.03 \leq y \leq 0.95$, $0.005 \leq z \leq 0.70$ and $0 \leq z_n \leq 0.70$ ($n=1, 2, 3, 4$);

2. $A(Al_{[x]}Cr_{[y]}B_{[z]})_2O_4$ wherein A is Mg, Ni, Co, Mn or Zn, B is Fe, Mn, Co or Sb, $x$ is from 0.005 to 0.80, $y$ is from 0.03 to 0.95, $z$ is from 0.005 to 0.70, and $x+y+z=1$;

3. $(Mg_{[1-p]}A_{[p]}) (Al_{[x]}Cr_{[y]}B_{[z]})_2O_4$ wherein A is Ni, Co, Mn or Zn, B is Fe, Mn, Co or Sb, and $p$ is from 0.001 to 0.999. This composition corresponds to $Mg(Al_{[x]}Cr_{[y]}B_{[3]})_2O_4$ (which is one of the above No. (2) compositions) where Mg is partially substituted by Ni, Co, Mn or Zn; $x$, $y$ and $z$ are as defined in (2) above.

4. $(Ni_{[1-p]}A_{[p]}) (Al_{[x]}Cr_{[y]}B_{[z]})_2O_4$ wherein A is Co, Mn or Zn, B is Fe, Mn, Co or Sb, and $p$ is from 0.001 to 0.999; $x$, $y$ and $z$ are as defined in (2) above;

5. $(Co_{[1-p]}A_{[p]})(Al_{[x]}Cr_{[y]}B_{[z]})_2O_4$ wherein A is Mn or Zn, B is Fe, Mn, Co or Sb, and $p$ is from 0.001 to 0.999; $x$, $y$ and $z$ are as defined in (2) above.

6. $(Zn_{[1-p]}Mn_{[p]}) (Al_{[x]}Cr_{[y]}B_{[z]})_2O_4$ wherein B is Fe, Mn, Co or Sb, and $p$ is from 0.001 to 0.999; $x$, $y$ and $z$ are as defined in (2) above;

7. $(Mg_{[1-p-q]}Ni_{[p]}A_{[q]}) (Al_{[x]}Cr_{[y]}B_{[z]})_2O_4$ wherein A is Co, Mn or Zn, B is Fe, Mn, Co or Sb, $p$ is from 0.001 to 0.999, $q$ is from 0.0005 to 0.998, and $p+q<1$. This composition corresponds to $(Mg_{[1-p]}Ni_{[p]}) (Al_{[x]}Cr_{[y]}B_{[z]})_2O_4$ (which is one of the above No. (3) compositions) where Ni is partially substituted by Co, Mn or Zn; $x$, $y$ and $z$ are as defined in (2) above;

8. $(Ni_{[1-p-q]}Co_{[p]}A_{[q]}) (Al_{[x]}Cr_{[y]}B_{[z]})_2O_4$ wherein A is Mn or Zn, B is Fe, Mn, Co or Sb, $p$ is from 0.001 to 0.999, $q$ is from 0.0005 to 0.998, and $p+q<1$; $x$, $z$ and $z$ are as defined in (2) above;

9. $A(Al_{[x]}Cr_{[y]}Fe_{[z-w]}B_{[w]})_2O_4$ wherein A is Mg, Ni, Co, Mn or Zn, B is Mn, Co or Sb, and $w$ is from 0.001 to 0.699. This composition corresponds to $A (Al_{[x]}Cr_{[y]}Fe_{[z]})_2O_4$ which is one of the above No. 2 compositions where Fe is partially substituted by Mn, Co or Sb). X, $y$ and $z$ are as defined in (2) above;

10. $(Mg_{[1-p]}A_{[p]}) (Al_{[x]}Cr_{[y]}Fe_{[z-w]}B_{[w]})_2O_4$ wherein A is Ni, Co, Mn or Zn, B is Mn, Co or Sb, $p$ is from 0.001 to 0.999, $w$ is from 0.001 to 0.699; and $x$, $y$ and $z$ are as defined in (2) above;

11. $(Ni_{[1-p]}A_{[p]}) (Al_{[x]}Cr_{[y]}Fe_{[z-w]}B_{[w]})_2O_4$ wherein A is Co, Mn or Zn, B is Mn, Co or Sb, $p$ is from 0.001 to 0.999, and $w$ is from 0.001 to 0.699; $x$, $y$ and $z$ are as defined in (2) above;

12. $(Co_{[1-p]}A_{[p]}) (Al_{[x]}Cr_{[y]}Fe_{[z-w]}B_{[w]})_2O_4$ wherein A is Mn or Zn, B is Mn, Co or Sb, $p$ is from 0.001 to 0.999, $w$ is from 0.001 to 0.699 and $x$, $y$ and $z$ are as defined in (2) above;

13. $(Zn_{[1-p]}Mn_{[p]}) (Al_{[x]}Cr_{[y]}Fe_{[z-w]}B_{[w]})_2O_4$ wherein B is Mn, Co or Sb, $p$ is from 0.001 to 0.999, $w$ is from 0.001 to 0.699 and $x$, $y$ and $z$ are as defined in (2) above;

14. $(Mg_{[1-p-q]}Ni_{[p]}A_{[q]}) (Al_{[x]}Cr_{[y]}Fe_{[z-w]}B_{[w]})_2O_4$ wherein A is Co, Mn or Zn, B is Mn, Co or Sb, $p$ is from 0.001 to 0.999, $q$ is from 0.0005 to 0.998, $p+q<1$, $w$ is from 0.001 to 0.699 and $x$, $y$ and $z$ are as defined in (2) above;

15. $(Ni_{[1-p-q]}C_{[p]}A_{[q]}) (Al_{[x]}Cr_{[y]}Fe_{[z-w]}B_{[w]})_2O_4$ wherein A is Mn or Zn, B is Mn, Co or Sb, $p$ is from 0.001 to 0.999, $q$ is from 0.0005 to 0.998, $p+q<1$, and $w$ is from 0.001 to 0.699, and $x$, $y$ and $z$ are as defined in (2) above.

Preferable compositions according to the present invention are:

16. More than 80 molar percent of a spinel-type solid solution in a chemical formula of $A(Al_{[x]}Cr_{[y]}B_{[z]})_2O_4$ and less than 20 molar percent of an oxide of the chemical formula AO, wherein A is Mg, Ni, Co, Mn or Zn, B is Fe, Mn, Co or Sb, $0.005 \leq x \leq 0.80$, $0.03 \leq y \leq 0.95$, $0.005 \leq z \leq 0.70$, and $x+y+z=1$.

17. More than 80 molar percent of a spinel type solid solution in a chemical formula $A(Al_{[x]}Cr_{[y]}B_{[z]})_2O_4$ and less than 20 molar percent in the sum of the amounts of $Al_2O_3$, $Cr_2O_3$ and $[B]_2O_3$ which are in a molar fraction of $x$, $y$ and $z$, respectively, wherein A is Mg, Ni, Co, Mn or Zn, and B is Fe, Mn, Co or Sb, $0.005 \leq x \leq 0.80$, $0.03 \leq y \leq 0.95$, $0.005 \leq z \leq 0.70$, and $x+y+z=1$.

18. More than 80 molar percent of a spinel-type solid solution in a chemical formula of $(Mg_{[1-p]}A_{[p]}) (Al_{[x]}Cr_{[y]}B_{[z]})_2O_4$ and less than 20 molar percent in the sum of the amounts of MgO and AO which are in a molar fraction of $1-p$ and $p$, respectively, wherein A is Mg, Ni, Co, Mn or Zn, B is Fe, Mn, Co or Sb, $p$ is from 0.001 to 0.999, $0.005 \leq x \leq 0.80$, $0.03 \leq y \leq 0.95$, $0.005 \leq z \leq 0.70$, and $x+y+z=1$.

19. More than 80 molar percent of a spinel-type solid solution in a chemical formula of $(Mg_{[1-p]}A_{[p]}) Al_{[x]}Cr_{[y]}B_{[z]})_2O_4$ and less than 20 molar percent in the sum of the amounts of $Al_2O_3$, $Cr_2O_3$ and $[B]_2O_3$ which are in a molar fraction of $x$, $y$ and $z$, respectively, wherein A is Mg, Ni, Co, Mn or Zn, B is Fe, Mn, Co, or Sb, $p$ is from 0.001 to 0.999, $0.005 \leq x \leq 0.80$, $0.03 \leq y \leq 0.95$, $0.005 \leq z \leq 0.70$, and $x+y+z=1$.

The manufacturing process for producing the material of the invention and preparing high-temperature thermistors therefrom is as follows. The starting mixture of MgO, NiO, CoO, $MnCO_3$ (is converted to MnO by heating), ZnO, $Al_2O_3$, $Cr_2O_3$, $Fe_2O_3$, $MnO_2$ and $Sb_2O_3$ taken in the appropriate proportions is thoroughly mixed in the presence of alcohol in an agate drum, and after being mixed the mixture is prefired at a temperature of 1100°C to 1500°C for a period of 1 to 5 hours. The prefired mixture is then subjected to wet grinding in an agate drum for 3 to 24 hours. And then, the prefired powders are dried, mixed with pure water by 6% in weight and granulated. After that, the powders are pressed into a form of rod of 2 mm in diameter and 4 mm in thickness, with inserting two lead wires of platinum of 0.3 mm in diameter into the rod-shaped powder compact, as shown in FIG. 1. In next, the pressed rods with Pt leads are sintered at a temperture ranging from 1400° to 1700°C in air for a period of 1 to 5 hours. In FIG. 1, the reference numeral 1001 designates a sintered body of a high temperature thermistor having a composition according to the invention. A pair of electrodes 1002, which are made of platinum, are set to the powder compact of the high temperature thermistor material at a pressing process, as described above, before sintering. The outside parts of the elctrodes 1002 are used also as the lead wires.

For the obtained rods of high temperature thermistors, the resistance was measured in a temperature range from 20°C to 1400°C, and B-values was calculated from the following equation:

$$\frac{R_1}{R_2} = \exp\left(\frac{B}{T_1} - \frac{B}{T_2}\right)$$

where $R_1$ is electrical resistance at $T_1°K$ and $R_2$ is electrical resistance at $T_2°K$. The constant B is named a B-value, as described above. Furthermore, aging tests, which are important for practical use, were examined. The resistance of said high temperature thermistors was masured with the lapse of time at a soaking temperature of 1000°C under a continuous application of a d.c. voltage of 6V. Resistance deviating in an aging test is defined by the term of $$\frac{R_t - R_o}{R_o} \times 100 (\%),$$

where $R_o$ is an initial resistance in an aging test and $R_t$ is a resistance in the lapse of the time $(t)$.

EXAMPLE 1

Mixtures of magnsium oxide, alumina oxide, chromium oxide and ferric oxide in the composition listed in Table 1(a) were thoroughly mixed in the presence of alcohol in an agate drum for 5 hours.

Table 1(a)

| Sample No. | Compositions (mol ratio) | | | | Prefiring temperature (°C) | Sintering temperature (°C) |
|---|---|---|---|---|---|---|
| | MgO | Al₂O₃ | Cr₂O₃ | Fe₂O₃ | | |
| 1 | 1.00 | 0.80 | 0.005 | 0.195 | 1350 | 1650 |
| 2 | 1.00 | 0.80 | 0.195 | 0.005 | 1400 | 1700 |
| 3 | 1.00 | 0.005 | 0.95 | 0.045 | 1300 | 1650 |
| 4 | 1.00 | 0.045 | 0.95 | 0.005 | 1350 | 1700 |
| 5 | 1.00 | 0.005 | 0.295 | 0.70 | 1150 | 1520 |
| 6 | 1.00 | 0.295 | 0.005 | 0.70 | 1150 | 1520 |
| 7 | 1.00 | 0.30 | 0.50 | 0.20 | 1250 | 1650 |
| 8 | 1.00 | 0.05 | 0.50 | 0.45 | 1200 | 1600 |
| 9 | 1.00 | 0.50 | 0.25 | 0.25 | 1250 | 1620 |
| 10 | 1.00 | 0.02 | 0.90 | 0.08 | 1300 | 1650 |
| 11 | 1.00 | 0.15 | 0.50 | 0.35 | 1200 | 1620 |
| 12 | 1.00 | 0.40 | 0.40 | 0.20 | 1250 | 1650 |

The mixtures were dried and pressed into cakes at a pressure of 400kg/cm². The cakes were prefired at each temperature shown in Table 1(a) for 3 hours. The prefired cakes were wet ground in an agate drum for 5 hours.

Figure 2:
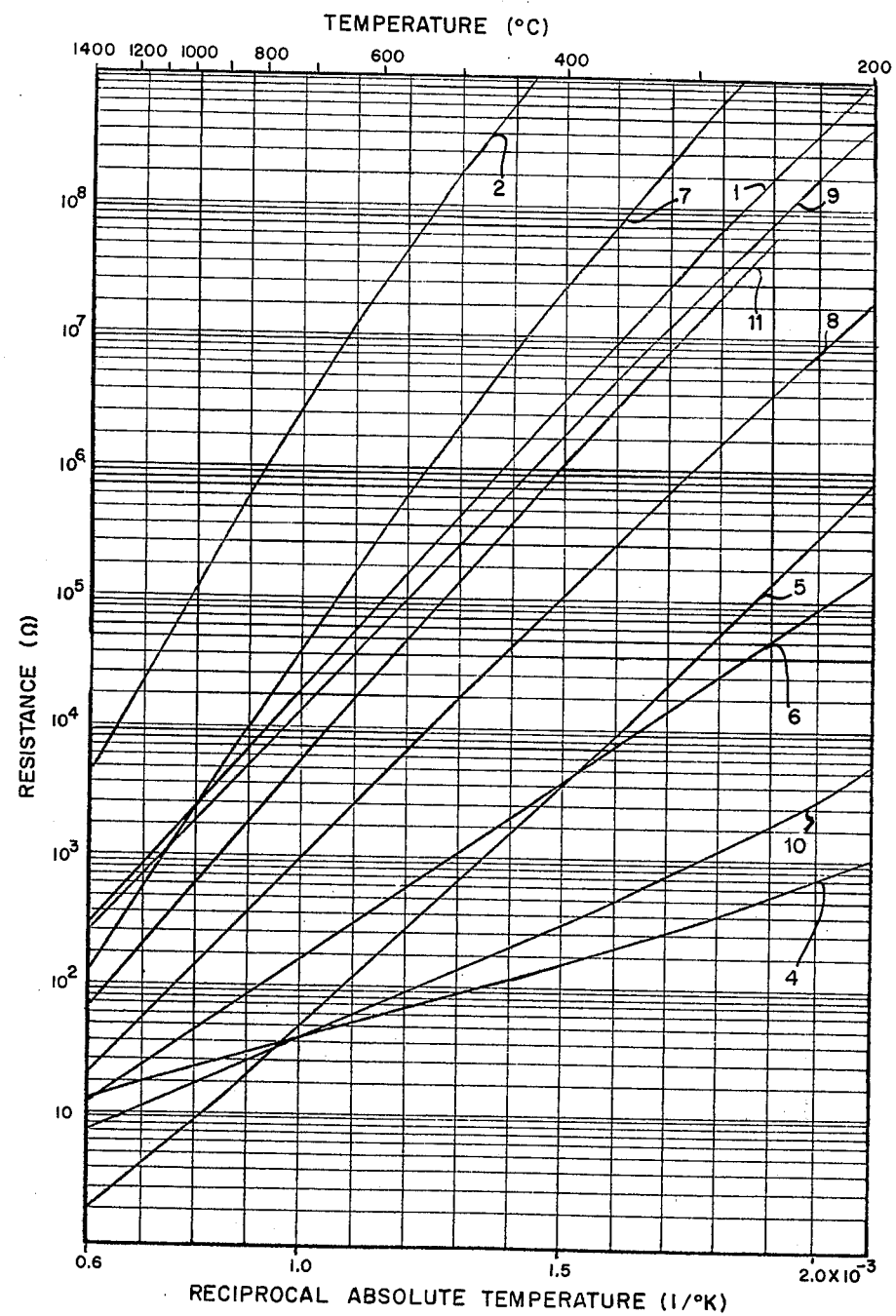
FIG. 2 is a graph showing the temperature dependence of electrical resistivity of a high temperature thermistor of a composition including magnesium oxide, aluminum oxide, chromium and ferric oxide in accordance with the present invention.

And then, the ground powders were dried, mixed with a pure water by 6 weight % and granulated. After that, the powders were pressed into a form of rod of 2 mm in diameter and 4 mm in thickness, with inserting two lead wires of platinum of 0.3mm in diameter were inserted into the rod-type powder compact. The pressed rods with $P_t$ leads were sintered in air at each temperature given in Table 1(a) for 3 hours. The resultant rods have a temperature dependence of electrical resistance as shown in FIG. 2, wherein the sample Nos. correspond to the compositons listed in Table 1(a). For each sample, the resistances at temperatures of 600°C and 1000°C, B-value between both temperatures of 600°C and 1000°C, and resistance deviation in ageing for 100 hours and 1000 hours are given in Table 1(b).

Table 1(b)

| Sample No. | Resistance (Ω) | | B-value | Resistance deviation $\frac{R_t - R_o}{R_o} \times 100 (\%)$ | |
|---|---|---|---|---|---|
| | at 600°C | at 1000°C | | in the lapse of 100 hrs. | in the lapse of 100 hrs. |
| 1 | 9.8 × 10⁴ | 2.3 × 10³ | 10500 | + 86 | + 530 |
| 2 | 2.8 × 10⁷ | 9.9 × 10⁴ | 15700 | + 78 | + 365 |
| 3 | 6.7 × 10 | 1.6 × 10 | 4000 | + 9.4 | + 99 |
| 4 | 6.0 × 10 | 2.4 × 10 | 2600 | + 85 | + 510 |
| 5 | 2.1 × 10² | 8.2 | 9000 | + 37 | + 110 |
| 6 | 4.5 × 10² | 4.4 × 10 | 6500 | + 28 | + 82 |
| 7 | 3.3 × 10⁵ | 2.2 × 10³ | 13900 | + 1.3 | + 8.0 |
| 8 | 4.3 × 10³ | 1.3 × 10² | 9700 | + 5.9 | + 29 |
| 9 | 6.0 × 10⁴ | 2.0 × 10³ | 9500 | + 2.5 | + 13 |
| 10 | 7.2 × 10 | 1.8 × 10 | 3900 | + 14 | + 105 |
| 11 | 3.3 × 10⁴ | 5.4 × 10² | 11400 | + 1.7 | + 9.7 |
| 12 | 7.2 × 10⁴ | 1.7 × 10³ | 10400 | − 0.4 | + 3.9 |

EXAMPLE 2

High temperature thermistors of compositons listed in Table 2(a) were prepared in a manner similar to that of Example 1.

Table 2(a)

| Sample No. | Compositions (ingredient) (mol ratio) | | | | Prefiring temperature (°C) | Sintering temperature (°C) |
|---|---|---|---|---|---|---|
| | 1.00 | 0.30 | 0.50 | 0.20 | | |
| 13 | MgO | Al₂O₃ | Cr₂O₃ | Mn₂O₃ | 1250 | 1650 |
| 14 | " | " | " | Co₂O₃ | " | " |
| 15 | " | " | " | Sb₂O₃ | " | " |
| 16 | NiO | " | " | Fe₂O₃ | " | 1620 |
| 17 | " | " | " | Mn₂O₃ | " | " |
| 18 | " | " | " | Co₂O₃ | " | " |
| 19 | " | " | " | Sb₂O₃ | " | " |
| 20 | CoO | " | " | Fe₂O₃ | " | 1640 |
| 21 | " | " | " | Mn₂O₃ | " | " |
| 22 | " | " | " | Sb₂O₃ | " | " |
| 23 | MnO | " | " | Fe₂O₃ | " | 1620 |
| 24 | " | " | " | Co₂O₃ | " | " |
| 25 | " | " | " | Sb₂O₃ | " | " |
| 26 | ZnO | " | " | Fe₂O₃ | " | 1640 |
| 27 | " | " | " | Mn₂O₃ | " | " |
| 28 | " | " | " | Co₂O₃ | " | " |
| 29 | " | " | " | Sb₂O₃ | " | " |

For each sample of the resultant high temperature thermistors, the measured resistances at temperatues of 600°C and 1000°C, B-value between both temperatures of 600°C and 1000°C, and resistance deviation in aging for 100 hours and 1000 hours are given in Table 2(b).

Table 2(b)

| Sample No. | Resistance (Ω) at 600°C | Resistance (Ω) at 1000°C | B-value | Resistance deviation $\frac{R_t-R_o}{R_o} \times 100\%$ in the lapse of 100 hrs | in the lapse of 1000 hrs |
|---|---|---|---|---|---|
| 13 | $1.2 \times 10^4$ | $8.0 \times 10^2$ | 7500 | 2.6 | 13.5 |
| 14 | $4.9 \times 10^5$ | $2.4 \times 10^3$ | 14800 | 1.8 | 10.6 |
| 15 | $5.5 \times 10^4$ | $1.1 \times 10^3$ | 10900 | 3.9 | 25 |
| 16 | $3.2 \times 10^4$ | $3.2 \times 10^2$ | 12800 | 1.8 | 5.0 |
| 17 | $4.1 \times 10^3$ | $1.4 \times 10^2$ | 9400 | 3.4 | 18 |
| 18 | $5.1 \times 10^4$ | $3.6 \times 10^2$ | 13800 | 2.1 | 11.5 |
| 19 | $1.8 \times 10^4$ | $4.1 \times 10^2$ | 10500 | 5.3 | 40 |
| 20 | $1.1 \times 10^4$ | $4.1 \times 10^2$ | 9100 | 3.6 | 21 |
| 21 | $3.4 \times 10^3$ | $1.7 \times 10^2$ | 8300 | 6.0 | 52 |
| 22 | $7.6 \times 10^3$ | $4.2 \times 10^2$ | 8000 | 7.2 | 67 |
| 23 | $9.3 \times 10^4$ | $2.0 \times 10^3$ | 10700 | 4.7 | 38 |
| 24 | $1.2 \times 10^5$ | $2.2 \times 10^3$ | 11100 | 8.2 | 71 |
| 25 | $3.5 \times 10^4$ | $4.0 \times 10^3$ | 6000 | 5.1 | 46 |
| 26 | $1.3 \times 10^3$ | $1.6 \times 10^2$ | 5800 | 4.2 | 34 |
| 27 | $4.0 \times 10^2$ | $8.5 \times 10$ | 4300 | 5.3 | 45 |
| 28 | $2.6 \times 10^3$ | $1.8 \times 10^2$ | 7400 | 8.5 | 66 |
| 29 | $1.0 \times 10^3$ | $1.5 \times 10^2$ | 5300 | 4.8 | 42 |

EXAMPLE 3

High temperature thermistors of compositions listed in Table 3(a) were prepared in a manner similar to that of Example 1.

Table 3(a)

| Sample No. | Compositions (mol ratio) MgO | NiO | $Al_2O_3$ | $Cr_2O_3$ | $Fe_2O_3$ | Prefiring temperature (°C) | Sintering temperature (°C) |
|---|---|---|---|---|---|---|---|
| 30 | 0.999 | 0.001 | 0.30 | 0.50 | 0.20 | 1250 | 1650 |
| 31 | 0.70 | 0.30 | 0.30 | 0.50 | 0.20 | 1250 | 1650 |
| 32 | 0.20 | 0.80 | 0.30 | 0.50 | 0.20 | 1250 | 1620 |
| 33 | 0.001 | 0.999 | 0.30 | 0.50 | 0.20 | 1250 | 1620 |
| 34 | 0.50 | 0.50 | 0.80 | 0.005 | 0.195 | 1300 | 1620 |
| 35 | 0.50 | 0.50 | 0.50 | 0.495 | 0.005 | 1350 | 1620 |
| 36 | 0.50 | 0.50 | 0.30 | 0.50 | 0.20 | 1250 | 1620 |
| 37 | 0.50 | 0.50 | 0.10 | 0.20 | 0.70 | 1150 | 1550 |
| 38 | 0.50 | 0.50 | 0.005 | 0.95 | 0.045 | 1300 | 1650 |

For each sample of the resultant high temperature thermistors, the measured electrical characteristics are given in Table 3(b).

Table 3(b)

| Sample No. | Resistance (Ω) at 600°C | Resistance (Ω) at 1000°C | B-value | Resistance deviation $\frac{R_t-R_o}{R_o} \times 100\%$ in the lapse of 100 hrs | in the lapse of 1000 hrs |
|---|---|---|---|---|---|
| 30 | $3.6 \times 10^5$ | $2.4 \times 10^3$ | 13900 | 6.4 | 45 |
| 31 | $3.5 \times 10^4$ | $6.8 \times 10^2$ | 11000 | 2.1 | 18 |
| 32 | $5.9 \times 10^3$ | $1.8 \times 10^2$ | 9700 | 0.8 | 4.1 |
| 33 | $3.1 \times 10^4$ | $3.2 \times 10^2$ | 12700 | 1.9 | 5.1 |
| 34 | $1.2 \times 10^6$ | $2.7 \times 10^4$ | 10500 | 22 | 140 |
| 35 | $3.5 \times 10^3$ | $2.7 \times 10^2$ | 7100 | 15 | 79 |
| 36 | $5.9 \times 10^3$ | $2.0 \times 10^2$ | 9400 | 1.1 | 9.4 |
| 37 | $6.6 \times 10$ | $1.9 \times 10$ | 3500 | 39 | 125 |
| 38 | $8.4 \times 10$ | $4.2 \times 10$ | 1900 | 98 | 720 |

EXAMPLE 4

High temperature thermistors of compositions listed in Table 4(a) were prepared in a manner similar to that of Example 1.

For each sample of the resultant high temperature thermistors, the measured electrical characteristics are given in Table 4(b).

Table 4(a)

| Sample No. | Compositions (ingredient) (mol ratio) 0.5 | 0.5 | 0.3 | 0.5 | 0.2 | Prefiring temperature (°C) | Sintering temperature (°C) |
|---|---|---|---|---|---|---|---|
| 39 | MgO | CoO | $Al_2O_3$ | $Cr_2O_3$ | $Fe_2O_3$ | 1250 | 1650 |
| 40 | ″ | ″ | ″ | ″ | $Mn_2O_3$ | ″ | ″ |
| 41 | ″ | ″ | ″ | ″ | $Sb_2O_3$ | ″ | ″ |
| 42 | ″ | MnO | ″ | ″ | $Fe_2O_3$ | ″ | 1640 |
| 43 | ″ | ″ | ″ | ″ | $Co_2O_3$ | ″ | ″ |
| 44 | ″ | ″ | ″ | ″ | $Sb_2O_3$ | ″ | ″ |
| 45 | ″ | ZnO | ″ | ″ | $Mn_2O_3$ | ″ | 1650 |
| 46 | ″ | ″ | ″ | ″ | $Co_2O_3$ | ″ | ″ |
| 47 | ″ | ″ | ″ | ″ | $Sb_2O_3$ | ″ | ″ |
| 48 | NiO | CoO | ″ | ″ | $Fe_2O_3$ | ″ | 1630 |

Table 4(a)-continued

| Sample No. | Compositions (ingredient) (mol ratio) | | | | | Prefiring temperature (°C) | Sintering temperature (°C) |
|---|---|---|---|---|---|---|---|
| | 0.5 | 0.5 | 0.3 | 0.5 | 0.2 | | |
| 49 | " | " | " | " | $Mn_2O_3$ | " | " |
| 50 | " | " | " | " | $Co_2O_3$ | " | " |
| 51 | " | " | " | " | $Sb_2O_3$ | " | " |
| 52 | " | MnO | " | " | $Fe_2O_3$ | " | 1620 |
| 53 | " | " | " | " | $Co_2O_3$ | " | " |
| 54 | " | " | " | " | $Sb_2O_3$ | " | " |
| 55 | " | ZnO | " | " | $Fe_2O_3$ | " | 1630 |
| 56 | " | " | " | " | $Mn_2O_3$ | " | " |
| 57 | " | " | " | " | $Co_2O_3$ | " | " |
| 58 | " | " | " | " | $Sb_2O_3$ | " | " |
| 59 | CoO | MnO | " | " | $Fe_2O_3$ | " | " |
| 60 | " | " | " | " | $Co_2O_3$ | " | " |
| 61 | " | " | " | " | $Sb_2O_3$ | " | " |
| 62 | " | ZnO | " | " | $Fe_2O_3$ | " | 1640 |
| 63 | " | " | " | " | $Mn_2O_3$ | " | " |
| 64 | " | " | " | " | $Sb_2O_3$ | " | " |
| 65 | ZnO | MnO | " | " | $Fe_2O_3$ | " | 1630 |
| 66 | " | " | " | " | $Mn_2O_3$ | " | " |
| 67 | " | " | " | " | $Co_2O_3$ | " | " |
| 68 | " | " | " | " | $SbO_3$ | " | " |

Table 4(b)

| Sample No. | Resistance (Ω) at 600°C | Resistance (Ω) at 1000°C | B-value | Resistance deviation $\frac{R_t-R_o}{R_o} \times 100$ (%) in the lapse of 100 hrs. | Resistance deviation $\frac{R_t-R_o}{R_o} \times 100$ (%) in the lapse of 1000 hrs. |
|---|---|---|---|---|---|
| 39 | $4.2 \times 10^3$ | $2.1 \times 10^2$ | 8300 | 1.1 | 6.8 |
| 40 | $2.0 \times 10^3$ | $16 \times 10^2$ | 7000 | 5.1 | 29 |
| 41 | $3.9 \times 10^3$ | $2.0 \times 10^2$ | 8300 | 2.5 | 16 |
| 42 | $1.8 \times 10^4$ | $5.7 \times 10^2$ | 9600 | 1.8 | 8.7 |
| 43 | $1.5 \times 10^4$ | $4.5 \times 10^2$ | 9700 | 1.4 | 6.5 |
| 44 | $1.4 \times 10^4$ | $4.7 \times 10^2$ | 9400 | 3.2 | 21 |
| 45 | $7.9 \times 10^2$ | $9.8 \times 10$ | 5800 | 6.7 | 47 |
| 46 | $1.5 \times 10^3$ | $1.5 \times 10^2$ | 6400 | 3.1 | 24 |
| 47 | $1.1 \times 10^3$ | $1.5 \times 10^2$ | 5500 | 3.6 | 29 |
| 48 | $2.8 \times 10^3$ | $1.8 \times 10^2$ | 7600 | 1.3 | 6.5 |
| 49 | $1.6 \times 10^3$ | $1.4 \times 10^2$ | 6800 | 4.8 | 27 |
| 50 | $5.6 \times 10^3$ | $2.6 \times 10^2$ | 8500 | 1.9 | 9.6 |
| 51 | $3.1 \times 10^3$ | $1.7 \times 10^2$ | 8100 | 2.6 | 18 |
| 52 | $9.3 \times 10^3$ | $3.0 \times 10^2$ | 9500 | 2.3 | 12 |
| 53 | $9.0 \times 10^3$ | $2.7 \times 10^2$ | 9700 | 2.0 | 9.9 |
| 54 | $9.1 \times 10^3$ | $2.9 \times 10^2$ | 9600 | 2.6 | 20 |
| 55 | $1.0 \times 10^3$ | $1.1 \times 10^2$ | 6100 | 4.1 | 27 |
| 56 | $6.1 \times 10^2$ | $9.1 \times 10$ | 5300 | 5.3 | 35 |
| 57 | $9.8 \times 10^2$ | $1.1 \times 10^2$ | 6100 | 3.7 | 22 |
| 58 | $9.2 \times 10^2$ | $1.2 \times 10^2$ | 5700 | 4.0 | 26 |
| 59 | $1.1 \times 10^4$ | $4.1 \times 10^2$ | 9100 | 2.9 | 23 |
| 60 | $1.3 \times 10^4$ | $4.0 \times 10^2$ | 9700 | 1.7 | 8.8 |
| 61 | $9.0 \times 10^3$ | $3.2 \times 10^2$ | 9300 | 4.3 | 41 |
| 62 | $9.8 \times 10^2$ | $1.0 \times 10^2$ | 6300 | 4.2 | 28 |
| 63 | $5.9 \times 10^2$ | $9.0 \times 10$ | 5200 | 5.5 | 37 |
| 64 | $9.1 \times 10^2$ | $1.2 \times 10^2$ | 5600 | 4.2 | 29 |
| 65 | $2.8 \times 10^3$ | $2.6 \times 10^2$ | 6600 | 6.4 | 42 |
| 66 | $1.5 \times 10^3$ | $2.4 \times 10^2$ | 5100 | 8.9 | 76 |
| 67 | $2.1 \times 10^3$ | $1.5 \times 10^2$ | 7300 | 3.6 | 28 |
| 68 | $1.9 \times 10^3$ | $1.9 \times 10^2$ | 6400 | 5.8 | 37 |

EXAMPLE 5

High temperature thermistors of compositions listed in Table 5(a) were prepared in a manner similar to that of Example 1.

For each sample of the resultant thermistors, the measured electrical characteristics are given in Table 5(b).

Table 5(a)

| Sample No. | Compositions (ingredient) (mol ratio) | | | | | | Prefiring temperature (°C) | Sintering temperature (°C) |
|---|---|---|---|---|---|---|---|---|
| | 0.4 | 0.3 | 0.3 | 0.3 | 0.5 | 0.2 | | |
| 69 | MgO | NiO | CoO | $Al_2O_3$ | $Cr_2O_3$ | $Fe_2O_3$ | 1250 | 1640 |
| 70 | " | " | " | " | " | $Mn_2O_3$ | " | " |
| 71 | " | " | " | " | " | $Sb_2O_3$ | " | " |
| 72 | " | " | MnO | " | " | $Fe_2O_3$ | " | 1630 |
| 73 | " | " | " | " | " | $CO_2O_3$ | " | " |
| 74 | " | " | " | " | " | $Sb_2O_3$ | " | " |
| 75 | " | " | ZnO | " | " | $Fe_2O_3$ | " | 1640 |
| 76 | " | " | " | " | " | $Mn_2O_3$ | " | " |
| 77 | " | " | " | " | " | $CO_2O_3$ | " | " |
| 78 | " | " | " | " | " | $Sb_2O_3$ | " | " |
| 79 | NiO | CoO | MnO | " | " | $Fe_2O_3$ | " | 1620 |
| 80 | " | " | " | " | " | $Sb_2O_3$ | " | " |

Table 5(a)-continued

| Sample No. | Compositions (ingredient) (mol ratio) | | | | | | Prefiring temperature (°C) | Sintering temperature (°C) |
|---|---|---|---|---|---|---|---|---|
| | 0.4 | 0.3 | 0.3 | 0.3 | 0.5 | 0.2 | | |
| 81 | " | " | ZnO | " | " | $Fe_2O_3$ | " | 1630 |
| 82 | " | " | " | " | " | $Mn_2O_3$ | " | " |
| 83 | " | " | " | " | " | $Co_2O_3$ | " | " |
| 84 | " | " | " | " | " | $Sb_2O_3$ | " | " |

Table 5(b)

| Sample No. | Resistance (Ω) | | B-value | Resistance deviation $\frac{R_t-R_o}{R_o} \times 100 \ (\%)$ | |
|---|---|---|---|---|---|
| | at 600°C | at 1000°C | | in the lapse of 100 hrs | in the lapse of 1000 hrs |
| 69 | $5.0 \times 10^3$ | $2.0 \times 10^2$ | 8900 | 1.0 | 8.2 |
| 70 | $2.2 \times 10^3$ | $1.1 \times 10^2$ | 8300 | 1.3 | 9.5 |
| 71 | $4.7 \times 10^3$ | $1.9 \times 10^2$ | 8900 | 1.3 | 8.7 |
| 72 | $9.0 \times 10^3$ | $3.5 \times 10^2$ | 9000 | 1.6 | 9.0 |
| 73 | $8.2 \times 10^3$ | $2.7 \times 10^2$ | 9500 | 1.4 | 7.9 |
| 74 | $8.0 \times 10^3$ | $3.2 \times 10^2$ | 8900 | 2.1 | 12 |
| 75 | $3.2 \times 10^3$ | $1.8 \times 10^2$ | 8000 | 2.7 | 21 |
| 76 | $9.5 \times 10^2$ | $1.4 \times 10^2$ | 5300 | 4.2 | 36 |
| 77 | $3.1 \times 10^3$ | $1.5 \times 10^2$ | 8400 | 1.8 | 8.3 |
| 78 | $1.3 \times 10^3$ | $1.6 \times 10^2$ | 5800 | 3.5 | 28 |
| 79 | $5.4 \times 10^3$ | $2.4 \times ^2$ | 8700 | 1.8 | 9.0 |
| 80 | $4.1 \times 10^3$ | $2.2 \times 10^2$ | 8100 | 2.9 | 24 |
| 81 | $1.7 \times 10^3$ | $1.4 \times 10^2$ | 6900 | 2.8 | 19 |
| 82 | $8.3 \times 10^2$ | $1.0 \times 10^2$ | 5900 | 4.6 | 40 |
| 83 | $1.7 \times 10^3$ | $1.2 \times 10^2$ | 7300 | 2.3 | 14 |
| 84 | $1.2 \times 10^3$ | $1.1 \times 10^2$ | 6600 | 2.7 | 22 |

EXAMPLE 6

High temperature thermistors of compositions listed in Table 6(a) were prepared in a manner similar to that of Example 1.

For each sample of the resultant thermistors, the measured electrical characteristics are given in Table 6(b).

EXAMPLE 7

High temperture thermistors of compositions listed in Table 7(a) were prepared in a manner similar to that of Example 1.

For each sample of the resultant thermistors, the measured electrical characteristics are given in Table 7(b).

Table 6(a)

| Sample No. | Compositions (ingredient) (mol ratio) | | | | | Prefiring temperature (°C) | Sintering temperature (°C) |
|---|---|---|---|---|---|---|---|
| | 1.0 | 0.3 | 0.5 | 0.1 | 0.1 | | |
| 85 | MgO | $Al_2O_3$ | $Cr_2O_3$ | $Fe_2O_3$ | $Mn_2O_3$ | 1250 | 1650 |
| 86 | " | " | " | " | $Co_2O_3$ | " | " |
| 87 | " | " | " | " | $Sb_2O_3$ | " | " |
| 88 | NiO | " | " | " | $Mn_2O_3$ | " | 1620 |
| 89 | " | " | " | " | $Co_2O_3$ | " | " |
| 90 | " | " | " | " | $Sb_2O_3$ | " | " |
| 91 | CoO | " | " | " | $Mn_2O_3$ | " | 1040 |
| 92 | " | " | " | " | $Sb_2O_3$ | " | " |
| 93 | MnO | " | " | " | $Co_2O_3$ | " | 1620 |
| 94 | " | " | " | " | $Sb_2O_3$ | " | " |

Table 6(b)

| Sample No. | Resistance (Ω) | | B-value | Resistance deviation $\frac{R_t-R_o}{R_o} \times 100 \ (\%)$ | |
|---|---|---|---|---|---|
| | at 600°C | at 1000°C | | in the lapse of 100 hrs | in the lapse of 1000 hrs |
| 85 | $5.4 \times 10^4$ | $1.4 \times 10^3$ | 10100 | 1.8 | 10.4 |
| 86 | $4.1 \times 10^5$ | $4.2 \times 10^3$ | 12700 | 1.5 | 9.1 |
| 87 | $1.6 \times 10^5$ | $1.7 \times 10^3$ | 12600 | 2.5 | 16 |
| 88 | $1.1 \times 10^4$ | $2.3 \times 10^2$ | 10700 | 2.7 | 12 |
| 89 | $4.2 \times 10^4$ | $3.4 \times 10^2$ | 13400 | 1.9 | 7.7 |
| 90 | $2.5 \times 10^4$ | $3.8 \times 10^2$ | 11600 | 3.7 | 24 |
| 91 | $6.0 \times 10^3$ | $2.8 \times 10^2$ | 8500 | 5.2 | 36 |
| 92 | $8.7 \times 10^3$ | $4.2 \times 10^2$ | 8400 | 5.5 | 43 |
| 93 | $1.1 \times 10^5$ | $2.1 \times 10^3$ | 11000 | 6.1 | 47 |
| 94 | $5.8 \times 10^4$ | $3.1 \times 10^3$ | 8100 | 4.8 | 42 |

Table 7(a)

| Sample No. | Compositions (ingredient) (mol ratio) | | | | | | Prefiring temperature (°C) | Sintering temperature (°C) |
|---|---|---|---|---|---|---|---|---|
| | 0.5 | 0.5 | 0.3 | 0.4 | 0.15 | 0.15 | | |
| 95 | MgO | NiO | $Al_2O_3$ | $Cr_2O_3$ | $Fe_2O_3$ | $Mn_2O_3$ | 1250 | 1620 |
| 96 | '' | '' | '' | '' | '' | $Co_2O_3$ | '' | '' |
| 97 | '' | '' | '' | '' | '' | $Sb_2O_3$ | '' | '' |
| 98 | '' | CoO | '' | '' | '' | $Mn_2O_3$ | '' | '' |
| 99 | '' | '' | '' | '' | '' | $Sb_2O_3$ | '' | '' |
| 100 | '' | MnO | '' | '' | '' | $Co_2O_3$ | '' | '' |
| 101 | '' | '' | '' | '' | '' | $Sb_2O_3$ | '' | '' |
| 102 | '' | ZnO | '' | '' | '' | $Mn_2O_3$ | '' | '' |
| 103 | '' | '' | '' | '' | '' | $Co_2O_3$ | '' | '' |
| 104 | '' | '' | '' | '' | '' | $Sb_2O_3$ | '' | '' |
| 105 | NiO | CoO | '' | '' | '' | $Mn_2O_3$ | '' | '' |
| 106 | '' | '' | '' | '' | '' | $Sb_2O_3$ | '' | '' |
| 107 | '' | MnO | '' | '' | '' | $Co_2O_3$ | '' | '' |
| 108 | '' | '' | '' | '' | '' | $Sb_2O_3$ | '' | '' |
| 109 | '' | ZnO | '' | '' | '' | $Mn_2O_3$ | '' | '' |
| 110 | '' | '' | '' | '' | '' | $Co_2O_3$ | '' | '' |
| 111 | '' | '' | '' | '' | '' | $Sb_2O_3$ | '' | '' |
| 112 | CoO | MnO | '' | '' | '' | $Sb_2O_3$ | '' | '' |
| 113 | '' | ZnO | '' | '' | '' | $Mn_2O_3$ | '' | '' |
| 114 | '' | '' | '' | '' | '' | $Sb_2O_3$ | '' | '' |
| 115 | ZnO | MnO | '' | '' | '' | $Co_2O_3$ | '' | '' |
| 116 | '' | '' | '' | '' | '' | $Sb_2O_3$ | '' | '' |

Table 7 (b)

| Sample No. | Resistance (Ω) at 600°C | Resistance (Ω) at 1000°C | B-value | Resistance deviation $\frac{R_t - R_o}{R_o} \times 100$ (%) in the lapse of 100 hrs | in the lapse of 1000 hrs |
|---|---|---|---|---|---|
| 95 | $4.6 \times 10^3$ | $1.8 \times 10^2$ | 9000 | 2.3 | 11 |
| 96 | $5.8 \times 10^3$ | $2.2 \times 10^2$ | 9100 | 1.7 | 8.3 |
| 97 | $2.9 \times 10^3$ | $1.3 \times 10^2$ | 8600 | 3.2 | 20 |
| 98 | $2.3 \times 10^3$ | $1.2 \times 10^2$ | 8200 | 3.3 | 24 |
| 99 | $3.2 \times 10^3$ | $1.4 \times 10^2$ | 8700 | 3.7 | 31 |
| 100 | $4.9 \times 10^4$ | $7.2 \times 10^2$ | 11700 | 4.5 | 37 |
| 101 | $2.1 \times 10^4$ | $6.8 \times 10^2$ | 9500 | 4.1 | 28 |
| 102 | $9.6 \times 10^2$ | $1.1 \times 10^2$ | 6000 | 5.6 | 46 |
| 103 | $6.0 \times 10^3$ | $2.5 \times 10^2$ | 8800 | 2.0 | 9.4 |
| 104 | $4.2 \times 10^3$ | $2.7 \times 10^2$ | 7600 | 3.1 | 18 |
| 105 | $1.1 \times 10^3$ | $7.9 \times 10$ | 7300 | 3.8 | 26 |
| 106 | $2.5 \times 10^3$ | $1.2 \times 10^2$ | 8400 | 4.3 | 33 |
| 107 | $5.8 \times 10^3$ | $2.4 \times 10^2$ | 8900 | 3.0 | 22 |
| 108 | $1.1 \times 10^4$ | $5.2 \times 10^2$ | 8500 | 4.2 | 35 |
| 109 | $9.3 \times 10^2$ | $1.0 \times 10^2$ | 6200 | 5.4 | 47 |
| 110 | $3.8 \times 10^3$ | $1.6 \times 10^2$ | 8800 | 2.6 | 18 |
| 111 | $2.3 \times 10^3$ | $1.4 \times 10^2$ | 7800 | 4.9 | 35 |
| 112 | $1.8 \times 10^3$ | $8.7 \times 10$ | 8400 | 5.1 | 43 |
| 113 | $8.6 \times 10^2$ | $9.7 \times 10$ | 6100 | 3.6 | 29 |
| 114 | $9.7 \times 10^2$ | $9.8 \times 10$ | 6400 | 4.2 | 34 |
| 115 | $4.6 \times 10^3$ | $1.8 \times 10^2$ | 9000 | 2.8 | 21 |
| 116 | $3.8 \times 10^3$ | $1.6 \times 10^2$ | 8800 | 3.1 | 27 |

EXAMPLE 8

High temperature thermistors of compositions listed in Table 8(a) were prepared in a manner similar to that of Example 1.

For each sample of the resultant thermistors, the measured electrical characteristics are given in Table 8(b).

Table 8(a)

| Sample No. | Compositions (ingredient)(mol ratio) | | | | | | | Prefiring temperature (°C) | Sintering temperature (°C) |
|---|---|---|---|---|---|---|---|---|---|
| | 0.4 | 0.3 | 0.3 | 0.3 | 0.5 | 0.1 | 0.1 | | |
| 117 | MgO | NiO | CoO | $Al_2O_3$ | $Cr_2O_3$ | $Fe_2O_3$ | $Mn_2O_3$ | 1250 | 1640 |
| 118 | '' | '' | '' | '' | '' | '' | $Sb_2O_3$ | '' | '' |
| 119 | '' | '' | MnO | '' | '' | '' | $Mn_2O_3$ | '' | 1630 |
| 120 | '' | '' | '' | '' | '' | '' | $Co_2O_3$ | '' | '' |
| 121 | '' | '' | '' | '' | '' | '' | $Sb_2O_3$ | '' | '' |
| 122 | '' | '' | ZnO | '' | '' | '' | $Mn_2O_3$ | '' | 1640 |
| 123 | '' | '' | '' | '' | '' | '' | $Co_2O_3$ | '' | '' |
| 124 | '' | '' | '' | '' | '' | '' | $Sb_2O_3$ | '' | '' |
| 125 | NiO | CoO | MnO | '' | '' | '' | $Co_2O_3$ | '' | 1620 |
| 126 | '' | '' | '' | '' | '' | '' | $Sb_2O_3$ | '' | '' |
| 127 | '' | '' | ZnO | '' | '' | '' | $Mn_2O_3$ | '' | '' |
| 128 | '' | '' | '' | '' | '' | '' | $Sb_2O_3$ | '' | '' |

Table 8(b)

| Sample No. | Resistance (Ω) at 600°C | Resistance (Ω) at 1000°C | B-value | Resistance deviation $\frac{R_t-R_o}{R_o} \times 100\ (\%)$ in the lapse of 100 hrs | in the lapse of 1000 hrs |
| --- | --- | --- | --- | --- | --- |
| 117 | $3.2 \times 10^3$ | $1.5 \times 10^2$ | 8500 | 2.8 | 18 |
| 118 | $3.1 \times 10^3$ | $1.4 \times 10^2$ | 8600 | 3.5 | 25 |
| 119 | $1.3 \times 10^3$ | $1.2 \times 10^2$ | 6600 | 3.7 | 28 |
| 120 | $2.0 \times 10^4$ | $4.1 \times 10^2$ | 10800 | 2.0 | 14 |
| 121 | $6.7 \times 10^3$ | $3.2 \times 10^2$ | 8500 | 3.6 | 26 |
| 122 | $2.2 \times 10^3$ | $1.4 \times 10^2$ | 7700 | 3.1 | 25 |
| 123 | $5.9 \times 10^3$ | $2.3 \times 10^2$ | 9000 | 1.8 | 8.8 |
| 124 | $3.4 \times 10^3$ | $2.0 \times 10^2$ | 7900 | 3.1 | 19 |
| 125 | $7.7 \times 10^3$ | $2.3 \times 10^2$ | 8900 | 2.8 | 17 |
| 126 | $5.2 \times 10^2$ | $3.0 \times 10^2$ | 7900 | 4.2 | 34 |
| 127 | $9.8 \times 10^2$ | $9.6 \times 10$ | 6500 | 4.3 | 35 |
| 128 | $2.4 \times 10^3$ | $1.3 \times 10^2$ | 8100 | 4.6 | 34 |

EXAMPLE 9

High temperature thermistors of compositions listed is Table 9(a) were prepared in a manner similar to that of Example 1.

For each sample of the resultant thermistors, the measured electrical characteristics are given in Table 9(b).

EXAMPLE 10

High temperature thermistors of compositions listed in Table 10(a) were prepared in a manner similar to that of Example 1.

For each sample of the resultant thermistors, the measured electrical characteristics are given in Table 10(b).

Table 9(a)

| Sample No. | Compositions (mole ratio) MgO | NiO | $Al_2O_3$ | $Cr_2O_3$ | $Fe_2O_3$ | Prefiring temperature (°C) | Sintering temperature (°C) |
| --- | --- | --- | --- | --- | --- | --- | --- |
| 129 | 1.01 | 0 | 0.3 | 0.5 | 0.2 | 1250 | 1650 |
| 130 | 1.03 | 0 | 0.3 | 0.5 | 0.2 | '' | '' |
| 131 | 1.10 | 0 | 0.3 | 0.5 | 0.2 | '' | 1670 |
| 132 | 1.25 | 0 | 0.3 | 0.5 | 0.2 | '' | '' |
| 133 | 1.10 | 0 | 0.5 | 0.25 | 0.25 | '' | 1650 |
| 134 | 0 | 1.01 | 0.3 | 0.5 | 0.2 | '' | 1620 |
| 135 | 0 | 1.05 | 0.3 | 0.5 | 0.2 | '' | '' |
| 136 | 0 | 1.25 | 0.3 | 0.5 | 0.2 | '' | 1640 |
| 137 | 0.51 | 0.51 | 0.3 | 0.5 | 0.2 | '' | '' |
| 138 | 0.55 | 0.55 | 0.3 | 0.5 | 0.2 | '' | 1650 |
| 139 | 0.625 | 0.625 | 0.3 | 0.5 | 0.2 | '' | 1670 |

Table 9(b)

| Sample No. | Resistance (Ω) at 600°C | Resistance (Ω) at 1000°C | B-value | Resistance deviation $\frac{R_t-R_o}{R_o} \times 100\ (\%)$ in the lapse of 100 hrs | in the lapse of 1000 hrs |
| --- | --- | --- | --- | --- | --- |
| 129 | $6.3 \times 10^4$ | $1.2 \times 10^3$ | 11000 | 1.4 | 8.6 |
| 130 | $3.4 \times 10^4$ | $8.3 \times 10^2$ | 10300 | 3.5 | 23 |
| 131 | $5.0 \times 10^3$ | $5.8 \times 10^2$ | 6000 | 21 | 75 |
| 132 | $2.1 \times 10^3$ | $4.7 \times 10^2$ | 4200 | 82 | 410 |
| 133 | $1.2 \times 10^3$ | $4.9 \times 10^2$ | 2500 | 37 | 120 |
| 134 | $2.0 \times 10^4$ | $2.8 \times 10^2$ | 12000 | 1.4 | 4.3 |
| 135 | $6.6 \times 10^3$ | $2.1 \times 10^2$ | 9600 | 8.9 | 28 |
| 136 | $1.5 \times 10^3$ | $1.4 \times 10^2$ | 6600 | 72 | 300 |
| 137 | $3.9 \times 10^3$ | $1.7 \times 10^2$ | 8700 | 0.8 | 7.3 |
| 138 | $1.8 \times 10^3$ | $1.2 \times 10^2$ | 7500 | 20 | 64 |
| 139 | $8.9 \times 10^2$ | $1.1 \times 10^2$ | 5800 | 65 | 270 |

Table 10(a)

| Sample No. | Compositions (mol ratio) MgO | NiO | $Al_2O_3$ | $Cr_2O_3$ | $Fe_2O_3$ | $Mn_2O_3$ | Prefiring temperature (%) | Sintering temperature (%) |
| --- | --- | --- | --- | --- | --- | --- | --- | --- |
| 140 | 1.00 | 0 | 0.303 | 0.505 | 0.202 | 0 | 1250 | 1650 |
| 141 | 1.00 | 0 | 0.309 | 0.515 | 0.206 | 0 | '' | '' |
| 142 | 1.00 | 0 | 0.33 | 0.55 | 0.22 | 0 | '' | '' |
| 143 | 1.00 | 0 | 0.375 | 0.625 | 0.250 | 0 | '' | '' |
| 144 | 1.00 | 0 | 0.75 | 0.25 | 0.25 | 0 | '' | '' |
| 145 | 1.00 | 0 | 0.33 | 0.55 | 0 | 0.22 | '' | '' |
| 146 | 1.00 | 0 | 0.375 | 0.625 | 0 | 0.25 | '' | '' |
| 147 | 0.50 | 0.50 | 0.33 | 0.55 | 0.22 | 0 | '' | '' |
| 148 | 0.50 | 0.50 | 0.33 | 0.55 | 0.11 | 0.11 | '' | '' |

Table 10(a)-continued

| Sample No. | Compositions (mol ratio) | | | | | | Prefiring temperature (%) | Sintering temperature (%) |
|---|---|---|---|---|---|---|---|---|
| | MgO | NiO | $Al_2O_3$ | $Cr_2O_3$ | $Fe_2O_3$ | $Mn_2O_3$ | | |
| 149 | 0.50 | 0.50 | 0.375 | 0.625 | 0.125 | 0.125 | " | " |

Table 10(b)

| Sample No. | Resistance (Ω) | | B-value | Resistance deviation $\frac{R_t-R_o}{R_o} \times 100$ (%) | |
|---|---|---|---|---|---|
| | at 600°C | at 1000°C | | in the lapse of 100 hrs | in the lapse of 1000 hrs |
| 140 | $4.4 \times 10^5$ | $2.3 \times 10^3$ | 14600 | 1.0 | 7.4 |
| 141 | $8.0 \times 10^5$ | $3.1 \times 10^3$ | 15400 | 3.8 | 18 |
| 142 | $2.0 \times 10^6$ | $3.4 \times 10^3$ | 17700 | 23 | 69 |
| 143 | $8.1 \times 10^6$ | $4.7 \times 10^3$ | 20700 | 76 | 320 |
| 144 | $2.1 \times 10^6$ | $9.8 \times 10^3$ | 14900 | 32 | 88 |
| 145 | $3.5 \times 10^6$ | $1.1 \times 10^3$ | 9600 | 18 | 56 |
| 146 | $8.0 \times 10^4$ | $1.6 \times 10^3$ | 10900 | 70 | 290 |
| 147 | $1.9 \times 10^4$ | $3.1 \times 10^2$ | 11400 | 15 | 54 |
| 148 | $2.3 \times 10^4$ | $2.5 \times 10^2$ | 12600 | 20 | 61 |
| 149 | $5.7 \times 10^4$ | $3.7 \times 10^2$ | 14000 | 73 | 310 |

All of the thermistors which have the compositions in accordance with the present invention show that their resistance deviation $$( \frac{R_t-R_o}{R_o} \times 100)$$

in the lapse of 100 hours under an application of d.c. 6V is smaller than 100%. All of these samples can be used in the working temperature of lower than 700°C. Especially, the samples, which show resistance deviation of smaller than 100% in the lapse of 1000 hours under an application of d.c. 6V, can be used in the working temperature of lower than 1000°C. Furthermore, the samples, which show resistance deviation of smaller than 10% in the lapse of 1000 hours under an application of d.c. 6V, are suitable for use in the working temperature of lower than 1300°C.

What is claimed is:

1. A high temperature thermistor composition comprising a spinel-type solid solution having the chemical formula of $(Mg_{[p_1]}Ni_{[p_2]}Co_{[p_3]}Mn_{[p_4]}Zn_{[p_5]})(Al_{[x]}Cr_{[y]}Fe_{[z_1]}Mn_{[z_2]}Co_{[z_3]}Sb_{[z_4]})_2O_4$, wherein $p_1+p_2+p_3+p_4+p_5=1$, $0 \leq p_n \leq 1$ ($n=1,2,3,4,5$), $z_1+z_2+z_3+z_4=z$, $x+y+z=1$, $0.005 \leq x \leq 0.80$, $0.03 \leq y \leq 0.95$, $0.005 \leq z \leq 0.70$ and $0 \leq z_n \leq 0.70$ ($n=1,2,3,4$).

2. A high temperature thermistor composition as claimed in claim 1, wherein said spinel-type solid solution having a chemical formula of A $(Al_xCr_yB_z)_2O_4$ wherein A stands for a metal selected from the group consisting of Mg, Ni, Co, Mn and Zn, and B stands for a metal selected from the group consisting of Fe, Mn, Co and Sb, and x ranges from 0.005 to 0.80, y ranges from 0.03 to 0.95, z ranges from 0.005 to 0.70, and the sum of x, y and z is unity.

3. A high temperature thermistor composition as claimed in claim 1, wherein said spinel-type solid solution in a chemical formula of $(Mg_{1-p}A_p)(Al_xCr_yB_z)_2O_4$ wherein A stands for a metal selected from the group consisting of Ni, Co, Mn and Zn, and B stands for a metal selected from the group consisting of Fe, Mn, Co and Sb, and p ranges from 0.001 to 0.999, x ranges from 0.005 to 0.80, y ranges from 0.03 to 0.95, z ranges from 0.005 to 0.70, and the sum of x, y and z is unity.

4. A high temperature thermistor composition as claimed in claim 1, wherein said spinel-type solid solution in a chemical formula of $(Ni_{1-p}A_p)(Al_xCr_yB_z)_2O_4$ wherein A stands for a metal selected from the group consisting of Co, Mn and Zn, and B stands for metal selected from the group consisting of Fe, Mn, Co and Sb, and p ranges from 0.001 to 0.999, x ranges from 0.005 to 0.80, y ranges from 0.03 to 0.95, z ranges from 0.005 to 0.70, and the sum of x, y and z is unity.

5. A high temperature thermistor composition as claimed in claim 1, wherein said spinel-type solid solution in a chemical formula of $(Co_{1-p}A_p)(Al_xCr_yB_z)_2O_4$ wherein A stands for a metal selected from the group consisting of Mn and Zn, and B stands for a metal selected from the group consisting of Fe, Mn, Co and Sb, and p ranges from 0.001 to 0.999, x ranges from 0.005 to 0.80, y ranges from 0.03 to 0.95, z ranges from 0.005 to 0.70 and the sum of x, y and z is unity.

6. A high temperature thermistor composition as claimed in claim 1, wherein said spinel-type solid solution in a chemical formula of $(Zn_{(1-p)}Mn_{(p)})(Al_{(x)}Cr_{(y)}B_{(z)})_2O_4$ wherein B stands for a metal selected from the group consisting of Fe, Mn, Co and Sb, and p ranges from 0.001 to 0.999, x ranges from 0.005 to 0.80, y ranges from 0.03 to 0.95, z ranges from 0.005 to 0.70, and the sum of x, y and z is unity.

7. A high temperature thermistor composition as claimed in claim 1, wherein said spinel-type solid solution in a chemical formula of $(Mg_{1-p-q}Ni_pA_q)(Al_xCr_yB_z)_2O_4$ wherein A stands for a metal selected from the group consisting of Co, Mn and Zn, and B stands for a metal selected from the group consisting of Fe, Mn, Co and Sb, and p ranges from 0.001 to 0.999, q ranges from 0.0005 to 0.998, the sum of p and q is smaller than unity, x ranges from 0.005 to 0.80, y ranges from 0.03 to 0.95, z ranges from 0.005 to 0.70, and the sum of x, y and z is unity.

8. A high temperature thermistor composition as claimed in claim 1, wherein said spinel-type solid solution in a chemical formula of $(Ni_{1-p-q}Co_pA_q)(Al_xCr_yB_z)_2O_4$ wherein A stands for a metal selected from the group consisting of Mn and Zn, B stands for a metal selected from the group consisting of Fe, Mn, Co and Sb, and p ranges from 0.001 to 0.999, q ranges from 0.0005 to 0.998, the sum of p and q is smaller than unity, $x$ ranges from 0.005 to 0.80, $y$ ranges from 0.03 to 0.95, $z$ ranges from 0.005 to 0.70, and the sum of $x$, $y$ and $z$ is unity.

9. A high temperature thermistor composition as claimed in claim 1, wherein said spinel-type solid solution in a chemical formula of A $(Al_xCr_yFe_{z-w}B_w)_2O_4$ wherein A stands for a metal selected from the group consisting of Mg, Ni, Co, Mn and Zn, B stands for a metal selected from the group consisting of Mn, Co and Sb, and $x$ ranges from 0.005 to 0.80, $y$ ranges from 0.03 to 0.95, $z$ ranges from 0.005 to 0.70, $w$ ranges from 0.001 to 0.699, and the sum of $x$, $y$ and $z$ is unity.

10. A high temperature thermistor composition as claimed in claim 1, wherein said spinel-type solid solution in a chemical formula of $(Mg_{1-p}A_p)(Al_x Cr_yFe_{z-w}B_w)_2O_4$ wherein A stands for a metal selected from the group consisting of Ni, Co, Mn and Zn, B stands for a metal selected from the group consisting of Mn, Co and Sb, and $p$ ranges from 0.001 to 0.999, $x$ ranges from 0.005 to 0.80, $y$ ranges from 0.03 to 0.95, $z$ ranges from 0.005 to 0.70, $w$ ranges from 0.001 to 0.669 and the sum of $x$, $y$ and $z$ is unity.

11. A high temperature thermistor composition as claimed in claim 1, where in said spinel-type solid solution in a chemical formula of $(Ni_{1-p}A_p)(Al_x Cr_yFe_{z-w}B_w)_2O_4$ wherein A stands for a metal selected from the group consisting of Co, Mn and Zn, B stands for a metal selected from the group consisting of Mn, Co and Sb, and $p$ ranges from 0.001 to 0.999 $x$ ranges 0.005 to 0.80, $y$ ranges from 0.03 to 0.95, $z$ ranges from 0.005 to 0.70, $w$ ranges from 0.001 to 0.699, and the sum of $x$, $y$ and $z$ is unity.

12. A high temperature thermistor composition as claimed in claim 1, wherein said spinel-type solid solution in a chemical formula of $(Co_{1-p}A_p)(Al_x Cr_yFe_{z-w}B_w)_2O_4$ wherein A stands for a metal selected from the group consisting of Mn and Zn, B stands for a metal selected from the group consisting of Mn, Co and Sb and $p$ ranges from 0.001 to 0.999, $x$ ranges 0.005 to 0.80, $y$ ranges from 0.03 to 0.95, $z$ ranges from 0.005 to 0.70, $w$ ranges from 0.001 to 0.699, and the sum of $x$, $y$ and $z$ is unity.

13. A high temperature thermistor composition as claimed in claim 1, wherein said spinel-type solid solution in a chemical formula of $(Zn_{1-p}Mn_p)(Al_x Cr_yFe_{z-w}B_w)_2O_4$ wherein B stands for a metal selected from the group consisting of Mn, Co and Sb and $p$ ranges from 0.001 to 0.999, $x$ ranges from 0.005 to 0.80, $y$ ranges from 0.03 to 0.95, $z$ ranges form 0.005 to 0.70, $w$ ranges from 0.001 to 0.699, and the sum of $x$, $y$ and $z$ is unity.

14. A high temperature thermistor composition as claimed in claim 1, wherein said spinel-type solid solution in a chemical formula of $(Mg_{1-p-q}Ni_pA_q)(Al_x Cr_yFe_{z-w}B_w)_2O_4$ wherein A stands for a metal selected from the group consisting of Co, Mn and Zn, B stands for a metal selected from the group consisting of Mn, Co and Sb, and $p$ ranges from 0.001 to 0.999, $q$ ranges from 0.0005 to 0.998, the sum of $p$ and $q$ is smaller than unity, $x$ ranges from 0.005 to 0.80, $y$ ranges from 0.03 to 0.95, $z$ ranges from 0.005 to 0.70, $w$ ranges from 0.001 to 0.699, and the sum of $x$, $y$ and $z$ is unity.

15. A high temperture thermistor composition as claimed in claim 1, wherein said spinel-type solid solution in a chemical formula of $(Ni_{1-p-q}Co_pA_q)(Al_x Cr_yFe_{z-w}B_w)_2O_4$ wherein A stands for a metal selected from the group consisting of, Mn and Zn, B stands for a metal selected from the group consisting of Mn, Co and Sb, and $p$ ranges from 0.001 to 0.999, $q$ ranges from 0.0005 to 0.998, the sum of $p$ and $q$ is smaller than unity, $x$ ranges from 0.005 to 0.80, $y$ ranges from 0.03 to 0.95, $z$ ranges from 0.005 to 0.70, $w$ ranges from 0.001 to 0.699, and the sum of $x$, $y$ and $z$ is unity.

16. A high temperature themistor composition comprising more than 80 molar percent of a spinel-type solid solution in a chemical formula of A $(Al_xCr_yB_z)_2O_4$ and less than 20 molar percent of an oxide in a chemical formula of AO, wherein A stands for metal selected from the group consisting of Mg, Ni, Co, Mn and Zn, and B stands for a metal selected from the group consisting of Fe, Mn, Co and Sb, and $x$ ranges from 0.005 to 0.80, $y$ ranges from 0.03 to 0.95, $z$ ranges from 0.005 to 0.70, and the sum of $x$, $y$ and $z$ is unity.

17. A high temperature thermistor composition comprising more than 80 molar percent of a spinel-type solid solution in a chemical formula of A $(Al_xCr_yB_z)_2O_4$ and less than 20 molar percent in the sum of the amounts of $Al_2O_3$, $Cr_2O_3$ and an oxide in a chemical formula of $B_2O_3$ which are in a molar fraction of $x$, $y$ and $z$, respectively, wherein A stands for a metal selected from the group consisting of Mg, Ni, Co, Mn and Zn, and B stands for a metal selected from the group consisting of Fe Mn, Co and Sb, and $x$ ranges from 0.005 to 0.80, $y$ ranges from 0.03 to 0.95, $z$ ranges from 0.005 to 0.70, and the sum of $x$, $y$ and $z$ is unity.

18. A high temperature thermistor composition comprising more than 80 molar percent of a spinel-type solid solution in a chemical formula of $(Mg_{1-p}A_p)(Al_x Cr_yB_z)_2O_4$ and less than 20 molar percent in the sum of the amounts of MgO and an oxide in a chemical formula of AO which are in a molar fraction of $1-p$ and $p$, respectively, wherein A stands for a metal selected from the group consisting of Mg, Ni, Co, Mn and Zn, and B stands for a metal selected from the group consisting of Fe, Mn, Co and Sb, and $p$ ranges from 0.001 to 0.999, $x$ ranges from 0.005 to 0.80, $y$ ranges form 0.03 to 0.95 $z$ ranges from 0.005 to 0.70, and the sum of $x$, $y$ and $z$ is unity.

19. A high temperature thermistor composition comprising more than 80 molar percent of a spinel-type solid solution in a chemical formula of $(Mg_{1-p}A_p)(Al_x Cr_yB_z)_2O_4$ and less than 20 molar percent in the sum of the amounts of $Al_2O_3$, $Cr_2O_3$ and an oxide in a chemical formula of $B_2O_3$ which are in a molar fraction of $x$, $y$ and $z$, respectively, wherein A stands for a metal selected from the group consisting of Mg, Ni, Co, Mn and Zn, and B stands for a metal selected from the group consisting of Fe, Mn, Co and Sb, and $p$ ranges from 0.001 to 0.999, $x$ ranges from 0.005 to 0.80, $y$ ranges from 0.03 to 0.95, $z$ ranges from 0.005 to 0.70, and the sum of $x$, $y$ and $z$ is unity.

* * * * *